United States Patent [19]

Venkatesan et al.

[11] Patent Number: 4,589,487
[45] Date of Patent: May 20, 1986

[54] VISCOUS OIL RECOVERY

[75] Inventors: Valadi N. Venkatesan, Arlington; Paul B. Venuto, Dallas, both of Tex.

[73] Assignee: Mobil Oil Corporation, New York, N.Y.

[21] Appl. No.: 642,029

[22] Filed: Aug. 20, 1984

Related U.S. Application Data

[63] Continuation-in-part of Ser. No. 337,353, Jan. 6, 1982, abandoned.

[51] Int. Cl.$^4$ .................. E21B 43/22; E21B 43/24; E21B 43/243
[52] U.S. Cl. .................. 166/261; 166/272; 166/274
[58] Field of Search .............. 166/256, 261, 271, 272, 166/273, 274, 275, 303, 305 R, 307; 252/8.55 D

[56] References Cited

U.S. PATENT DOCUMENTS

| | | | |
|---|---|---|---|
| 2,813,583 | 11/1957 | Marx et al. | 166/271 |
| 3,024,841 | 3/1962 | Willman | 166/261 |
| 3,036,632 | 5/1962 | Koch et al. | 166/272 X |
| 3,091,292 | 5/1963 | Kerr | 166/271 |
| 3,221,813 | 12/1965 | Closmann et al. | 166/261 |
| 3,251,412 | 5/1966 | Cooke, Jr. et al. | 166/275 |
| 3,532,165 | 10/1970 | Raifsnider | 166/270 |
| 3,731,741 | 5/1973 | Palmer et al. | 160/274 |
| 4,068,716 | 1/1978 | Allen | 166/271 |
| 4,083,404 | 4/1978 | Allen | 166/261 |
| 4,124,071 | 11/1978 | Allen et al. | 166/263 |
| 4,325,433 | 4/1982 | Yen et al. | 166/273 |
| 4,333,529 | 6/1982 | McCorquodale | 166/267 |

OTHER PUBLICATIONS

"A Current Appraisal of Thermal Recovery", *Journal of Petroleum Technology*, Michael Prats, Aug. 1978, pp. 1129–1136.

*Primary Examiner*—George A. Suchfield
*Attorney, Agent, or Firm*—Alexander J. McKillop; Michael G. Gilman; Stanislaus Aksman

[57] ABSTRACT

A method of recovering oil from a subterranean, viscous oil-containing formation comprising injecting into the formation an aqueous solution of at least one salt of carbonic acid, and then recovering the oil from the formation by means of a drive means.

29 Claims, No Drawings

VISCOUS OIL RECOVERY

CROSS-REFERENCE TO RELATED APPLICATION

This is a continuation-in-part of application Ser. No. 337,353, filed on Jan. 6, 1982, now abandoned, the entire contents of which are incorporated herein by reference.

BACKGROUND OF THE INVENTION

1. Field of the Invention

This invention relates to a method of recovery of heavy, viscous oil from subterranean oil-containing formations. More particularly, this invention relates to an improved tertiary method of recovering heavy oil, wherein the oil is pretreated with a solution which increases its mobility and thereafter a drive fluid is used to displace and recover the oil from the formation.

2. Background of the Invention

There are vast reserves of heavy oil contained in subterranean formations whose natural characteristics, such as high viscosity, low API gravity, and high molecular weight render recovery thereof by primary oil recovery techniques commercially unfeasible due to the lack of natural reservoir energy. In addition, these reserves have relatively low permeability although they may have high porosity.

Attempts have been made in the past to employ known oil displacement procedures for tertiary recovery of the oil by injecting fluid through the formation between injection and production wells. Such attempts include waterflooding, miscible flooding, chemical or micellar flooding, polymer flooding, thermal recovery by hot fluid injection, thermal recovery by in-situ combustion and solvent flooding. Such techniques improve the mobility of the oil, thereby enhancing the recovery of heavy oil.

Among these recovery techniques, the miscible flooding process using carbon dioxide ($CO_2$) has often been used for enhanced oil recovery. The $CO_2$ miscible flooding process is often applicable to high gravity crude oils, e.g., 25 API, and involves high operating pressures (starting at about 1500 psi). These particular conditions under which the process is practiced produce true miscibility of oil or hydrocarbons with $CO_2$ thus forming a single phase, which can be recovered relatively readily from underground formations.

Attempts were made in the past to employ carbon dioxide for the recovery of heavy crude oils. Heavy crude oils are classified as those having a low API gravity and/or high viscosity which are difficult to produce by ordinary methods of primary and secondary oil recovery. They also contain very small amounts of low boiling components. At present, there is an increased interest in the application of carbon dioxide gas for reducing the viscosity of heavy oils thus causing a decrease in the effect of viscous forces associated with the in-situ recovery of heavy oils. However, preliminary review of the published literature suggests that the benefit of carbon dioxide in the miscible flooding processes may be less promising than expected. Even as a dissolved gas, the application of $CO_2$ in heavy oil does not look promising because: (i) the solubility of $CO_2$ in heavy oils having a low API gravity is lower than that in light oils, (ii) for pressures corresponding to reservoir depths of 2000 ft. or below, the solubility of $CO_2$ in $H_2O$ is comparable to that in heavy crude oil which competitively reduces the effective dissolution of the $CO_2$ gas in heavy crude oils, (iii) $CO_2$ compression costs for deep reservoirs are excessive, and (iv) the solubility of $CO_2$ markedly decreases above 80° C.

One of the most widely used secondary supplemental oil recovery techniques is waterflooding which involves the injection of water into an oil-containing formation. As the water moves through the formation, it acts to displace oil to a production system composed of one or more wells through which the oil is recovered. It has also been proposed to add surfactants to the injected water to lower the oil-water interfacial tension and/or alter the wettability characteristics of the formation rock to enhance recovery of the oil. Various surfactant waterflooding techniques are disclosed in U.S. Pat. No. 3,469,630 to Hurd et al. and U.S. Pat. No. 3,977,470 to Chang.

Another waterflooding technique is taught in U.S. Pat. No. 3,757,861 to Routson which discloses the introduction into the formation of an aqueous solution of peroxide, typically hydrogen peroxide, and thereafter or simultaneously the introduction of an aqueous solution of alkali metal hydroxides or carbonates or ammonium hydroxide.

Ralfsnider et al, U.S. Pat. No. 3,532,165 disclose the injection into an underground formation of a concentrated solution of an inorganic acid, e.g., hydrochloric or sulfuric acid, followed by the injection of a stoichiometric excess of a saturated solution of an inorganic salt, such as sodium carbonate. Alternatively, an aqueous solution of a sodium carbonate or bicarbonate is injected into the formation, followed by the injection of sodium sulfite or bisulfite. Both methods generate in-situ carbon dioxide.

However, there is still a need in the art of recovering heavy oils (gravity of not more than 20° API) and medium gravity oils (gravity of 20°-35° API) for improved recovery techniques which produce higher amounts of such oils than previously-known methods.

SUMMARY OF THE INVENTION

In accordance with the present invention, the recovery of heavy and medium gravity viscous oils from a subterranean oil-containing formation is enhanced by introducing into the formation through an injection well an aqueous solution of at least one inorganic, water-soluble salt of carbonic acid capable of forming a complex with the oil, thereby increasing the mobility of the oil. Thereafter, an oil drive process, also referred to herein as a driving means, e.g., injection of a drive fluid, is initiated in the formation through the injection well to displace the mobilized oil through the formation toward one or more production wells from which the oil is recovered.

In carrying out the invention, after fluid communication passages have been established in a conventional manner between the injection well and the production well, at least 0.20 pore volume, and preferably 0.25 to 0.70 pore volume, of an aqueous solution containing a minimum concentration of about 1.0 percent by weight of at least one inorganic, water-soluble salt of carbonic acid is injected into the oil-containing formation through the injection well. The solution is injected for a sufficient time to provide residence time of the solution in the formation of about 2 to about 10 days, preferably about 3-5 days. Thereafter, oil is recovered from the formation by a driving means, such as a drive fluid, e.g., hot water, steam, or a combination thereof, miscible drive, such as carbon dioxide, or a combustion front drive initiated by in-situ combustion. The drive fluid injected into the formation through the injection well displaces the mobilized oil through the formation toward the production well from which the oil is recovered. Alternatively, the aqueous solution is injected as slugs alternately with the driving means into the formation. In yet another alternative embodiment, the aqueous solution is continuously co-injected into the formation with the driving means to facilitate enhanced mobility of the oil.

DETAILED DESCRIPTION OF THE INVENTION

The process of the present invention can be used in recovering heavy oils having gravity of not more than 20° API, as well as medium gravity oils (having gravity of 20°-35° API), although it is most applicable to the recovery of heavy oils.

The aqueous solution contains at least 1% by weight, preferably from about 1% to about 10% by weight, and most preferably about 2% to about 6% by weight of at least one inorganic, water-soluble salt of carbonic acid which forms a complex with the oil of the formation. The formation of the complex increases the mobility of the oil and enhances its recovery from the formation through the subsequent use of the driving means. Both, carbonate and bicarbonate salts, also referred to herein as carbonates and bicarbonates, can be used in the process of this invention. Preferred salts are selected from the group consisting of alkali metal carbonates, alkali metal bicarbonates, alkaline earth metal carbonates, alkaline earth metal bicarbonates, ammonium carbonate, and ammonium bicarbonate. Examples of suitable carbonates are ammonium, sodium, potassium, rubidium, lithium, cesium, berylium, barium, magnesium, calcium and strontium carbonates. Examples of suitable bicarbonates are sodium, potassium, lithium, rubidium, cesium, ammonium, and francium bicarbonates. The most preferred salts are selected from the group consisting of sodium carbonate, sodium bicarbonate, potassium carbonate, potassium bicarbonate, ammonium carbonate, ammonium bicarbonate and mixtures thereof.

As an illustrative example, a viscous oil-containing formation is penetrated by at least one injection well and a spaced apart production well which are in fluid communication with a substantial portion of the formation through horizontal perforations. The communication can be established in the formation between the injection well and the production well using any conventional means, such as hydrofracturing, explosive means or nuclear means. Once fluid communication between the injection well and the production well has been established, at least 0.20 pore volume and preferably about 0.25 to about 0.70 pore volume, of the aqueous solution of at least one carbonic acid salt is injected into the formation through the injection well.

After the desired amount of the carbonic acid salt has been injected into the formation, a conventional oil drive process is initiated, such as the injection of carbon dioxide into the formation, through the injection well to displace the mobilized oil to the production well from which oil is recovered. The oil drive process is continued along with the production of oil until the produced oil contains an unfavorable amount of driving means, e.g., carbon dioxide. At this point, production is terminated.

The oil drive process employed after the injection of the solution of a salt of carbonic acid may include, in addition to carbon dioxide flooding, hot waterflooding, steam flooding, a mixture of steam and carbon dioxide flooding, steam stimulation, cyclic steam stimulation, in-situ combustion using an oxygen-containing gas to support combustion, production gas mixture recovered from in-situ combustion process and wet in-situ combustion which includes simultaneous injection of water and/or steam along with injection of the oxygen-containing gas. The oxygen-containing gas used for the in-situ combustion operation may include air, air enriched with oxygen, or essentially pure oxygen.

In an alternative embodiment, additional amounts of the aqueous carbonic acid salt solution may be periodically injected into the formation during the production step, i.e., during the oil drive process, in an amount of about 0.20 to about 0.25 pore volume in order to maintain a sufficient amount of the carbonic acid salt in the formation to mobilize the oil. In yet another alternative embodiment, once the initial portion of the carbonic acid salt solution has been injected, injection of the carbonic acid salt solution may be continued simultaneously with the oil drive process at a predetermined rate depending upon the characteristics of the formation and well pattern. In any of the embodiments, the most preferred driving means is carbon dioxide.

It is significant that the process of the present invention substantially enhances the recovery of oil from underground formation without the necessity of injecting into the formation several chemical agents, e.g., sulfuric acid, followed by the injection of sodium carbonate, or sodium carbonate or bicarbonate, followed by the injection of sodium sulfite or bisulfite, as thought necessary in prior art (e.g., see Ralfsnider et al, U.S. Pat. No. 3,532,165). Thus, the process of the present invention, although relatively simple and inexpensive because it relies on the injection of a solution of relatively easily available and inexpensive agents, is very effective in enhancing oil recovery, and particularly heavy oil recovery, from otherwise difficult to produce subterranean oil deposits.

The chemical or physical mechanism of the process of the present invention is not understood. However, without wishing to be bound by any theory of operability, it is thought that the injection, for the above-identified length of time, into the subterranean formation of an aqueous solution containing the above-identified amounts of at least one salt of carbonic acid causes the formation of a complex with the oil which increases the mobility of the oil in the formation. Accordingly, subsequent or simultaneous introduction of the driving means into the formation results in the recovery of the larger proportion of the oil than the introduction of the driving means alone. Although it is believed that the aqueous solution of at least one salt of carbonic acid used herein increases the mobility of the oil and thus renders it easier to recover by any means, the process of oil recovery is especially improved when the injection of the salt of carbonic acid is combined with the use of carbon dioxide as the driving means. The carbon dioxide may be injected through the injection well or it may be generated in situ by the decomposition of the carbonic acid salt or salts injected into the formation, as illustrated by the following equation for sodium bicarbonate.

$$2NaHCO_3 \rightarrow Na_2CO_3 + H_2O + CO_2$$

The carbonic acid salt or salts injected into the formation decompose under the underground deposit's recovery conditions of this invention.

While the invention has been described in terms of a single injection well and a single spaced apart production well, the method of the invention may be practiced using a variety of well patterns. Any other number of wells, which may be arranged according to any pattern, may be applied in using the present process as illustrated in U.S. Pat. No. 3,927,716 to Burdyn et al.

The term "pore volume" as used herein and in the appended claims is that volume of the portion of the formation defined by the injection and production wells, as described in greater detail in the aforementioned Burdyn et al. patent, the entire contents of which are incorporated herein by reference.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A method for recovering oil having the gravity of not greater than about 35° API from a subterranean, viscous oil-containing formation penetrated by at least one injection well and at least one spaced-apart production well, both of said injection and production wells being in fluid communication with a substantial portion of the formation, consisting essentially of the following steps in the recited order:
   (a) establishing fluid communication between the injection well and the production well;
   (b) injecting into the formation through the injection well at least 0.20 pore volume of an aqueous solution containing at least 1.0% by weight of at least one water-soluble, inorganic salt of carbonic acid to form a complex with the oil, thereby increasing the mobility of the oil, said injecting being conducted for a sufficient time to provide the residence time of the solution in the formation of about 2 to 10 days;
   (c) initiating an oil drive process in the formation through the injection well; and
   (d) recovering oil from the formation through the production well.

2. A method of claim 1 wherein said oil drive process consists essentially of the injection of a driving fluid through the injection well into the formation.

3. A method of claim 2 wherein the amount of the aqueous solution injected into the formation during step (b) is about 0.25 to about 0.70 pore volume.

4. A method of claim 3 wherein the aqueous solution contains about 1 to about 10% by weight of at least one water-soluble, inorganic salt of carbonic acid.

5. A method of claim 4 wherein the aqueous solution contains about 2 to about 6% by weight of at least one water-soluble, inorganic salt of carbonic acid.

6. A method of claim 5 wherein the driving fluid is carbon dioxide.

7. A method of claim 6 wherein said at least one salt of carbonic acid is selected from the group consisting of alkali metal carbonates, alkali metal bicarbonates, alkaline earth metal carbonates, alkaline earth metal bicarbonates, ammonium carbonate and ammonium bicarbonate.

8. A method of claim 7 wherein the salt of carbonic acid is selected from the group consisting of sodium carbonate, sodium bicarbonate, potassium carbonate, potassium bicarbonate, ammonium carbonate, ammonium bicarbonate and mixtures thereof.

9. A method of claim 5 wherein the driving fluid is hot water.

10. A method of claim 5 wherein the driving fluid is steam.

11. A method of claim 5 wherein the driving fluid is a mixture of steam and carbon dioxide.

12. A method of claim 5 wherein the driving fluid is the production gas from an in-situ combustion process.

13. A method of claim 5 wherein said driving fluid consists essentially of a combustion front initiated by an in-situ combustion operation in the formation by injecting an oxygen-containing gas into the formation.

14. A method of claim 13 wherein the oxygen-containing gas is air.

15. A method of claim 13 wherein the oxygen-containing gas is essentially pure oxygen.

16. A method of claim 13 wherein the oxygen-containing gas is air enriched with oxygen.

17. A method of claim 13 wherein steam is injected simultaneously with the oxygen-containing gas during the in-situ combustion operation.

18. A method of claim 13 wherein water is injected simultaneously with the oxygen-containing gas during the in-situ combustion operation.

19. A method for recovering oil having the gravity of not greater than about 35° API from a subterranean, viscous oil-containing formation penetrated by at least one injection well and at least one spaced-apart production well, both of said injection and production wells being in fluid communication with a substantial portion of the formation, consisting essentially of the following steps in the recited order:
   (a) establishing fluid communication between the injection well and the production well;
   (b) injecting into the formation through the injection well at least 0.20 pore volume of an aqueous solution containing at least 1.0% by weight of at least one water-soluble, inorganic salt of carbonic acid to form a complex with the oil, thereby increasing the mobility of the oil, said injecting being conducted for a sufficient time to provide the residence time of the solution in the formation of about 2 to 10 days;
   (c) initiating an oil drive process in the formation through the injection well;
   (d) repeating said step (b) at least once simultaneously with said step (c), and
   (e) recovering oil from the formation through the production well.

20. A method of claim 19 wherein said oil drive process consists essentially of the injection of a driving fluid through the injection well into the formation.

21. A method of claim 20 wherein the amount of the aqueous solution injected into the formation during step (b) is about 0.25 to about 0.70 pore volume.

22. A method of claim 21 wherein the aqueous solution contains about 1 to about 10% by weight of at least one water-soluble, inorganic salt of carbonic acid.

23. A method of claim 22 wherein the driving fluid is carbon dioxide.

24. A method of claim 22 wherein the driving fluid is a mixture of steam and carbon dioxide.

25. A method of claim 22 wherein said driving fluid consists essentially of a combustion front initiated by an in-situ combustion operation in the formation by injecting an oxygen-containing gas into the formation.

26. A method of claim 25 wherein the oxygen-containing gas is air.

27. A method of claim 26 wherein the oxygen-containing gas is air enriched with oxygen.

28. A method of claim 27 wherein said at least one salt of carbonic acid is selected from the group consisting of alkali metal carbonates, alkali metal bicarbonates, alkaline earth metal carbonates, alkaline earth metal bicarbonates, ammonium carbonate and ammonium bicarbonate.

29. A method of claim 28 wherein the salt of carbonic acid is selected from the group consisting of sodium carbonate, sodium bicarbonate, potassium carbonate, potassium bicarbonate, ammonium carbonate, ammonium bicarbonate and mixtures thereof.

* * * * *